April 13, 1926.
J. O. ALLSTOTT
FEED MIXER
Filed July 28, 1925
1,580,988
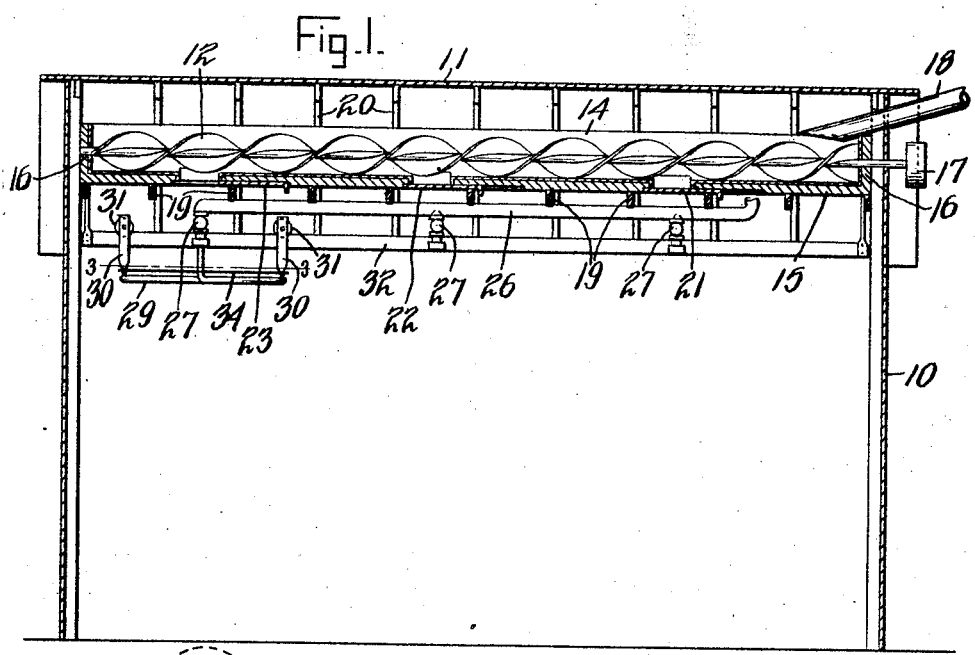
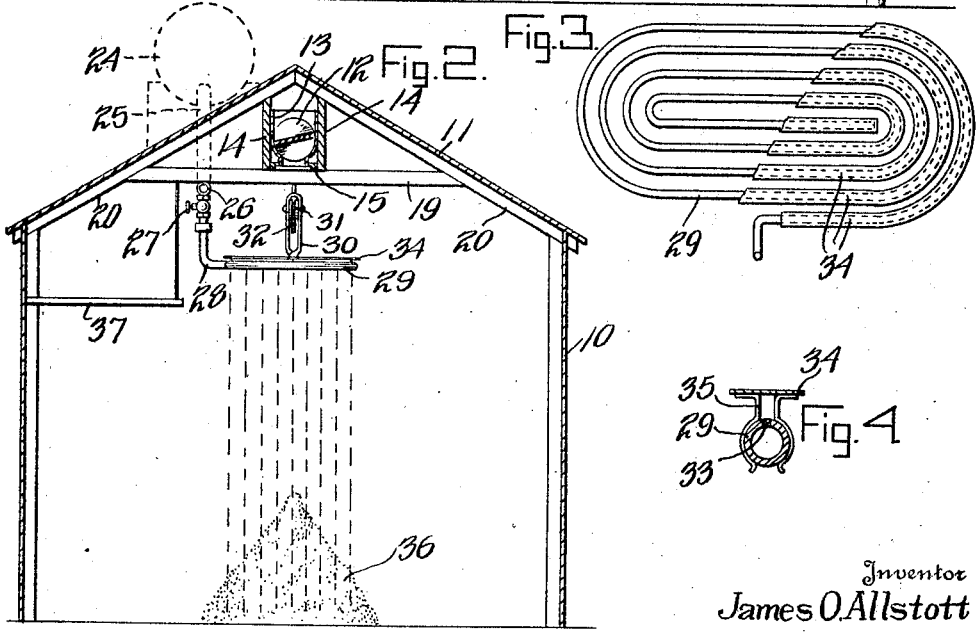
Inventor
James O. Allstott
By
Attorney Patented Apr. 13, 1926.

1,580,988

UNITED STATES PATENT OFFICE.

JAMES O. ALLSTOTT, OF PAOLI, OKLAHOMA.

FEED MIXER.

Application filed July 28, 1925. Serial No. 46,663.

*To all whom it may concern:*

Be it known that I, JAMES O. ALLSTOTT, a citizen of the United States, residing at Paoli, in the county of Garvin and State of Oklahoma, have invented certain new and useful Improvements in Feed Mixers, of which the following is a specification.

My said invention relates to a molasses feed mixer for mixing molasses with ground feed of various kinds, and it is an object of the invention to provide mechanism whereby the feed may be mixed with molasses in a barn loft, bin, or other storage room, in a rapid, uniform, and efficient manner, so as to be stored away for future use without further handling, thereby saving labor and the cost of handling and shipping as well as the cost of sacks, etc.

Referring to the accompanying drawings which are made a part hereof and on which similar reference characters indicate similar parts, Figure 1 is a side elevation of my device partly in section, Figure 2, an end elevation of the same partly in section, Figure 3, a plan of a part shown in Figs. 1 and 2, and Figure 4, a section on line 4—4 of Fig. 3.

In the drawings reference character 10 indicates the framework of a container of any suitable character, such as a barn or a bin adapted to store a mixture composed of ground feed, mingled with molasses or analogous material. In some instances various kinds of oil, for example, might be substituted for the molasses and there is no limit to the varieties of ground feed that can be stored in the manner hereinafter described, e. g., oats, wheat, hay, alfalfa, corn, etc. Neither is the mixture limited strictly to ground feed, as such feed may be shredded or otherwise disintegrated, or may even consist of small grains, hulls or the like in their natural condition. In the present instance I have illustrated the device of my invention as being mounted adjacent the ridge of the roof 11 of a barn.

The device comprises a conveyor 12 here shown as taking the form of a screw or auger conveyor mounted in a trough 13 of sheet-metal or the like supported by a trough-like structure having sides 14 and a bottom 15. The shaft of the screw conveyor is journaled at its ends in the end pieces 16 of the supporting structure and the shaft is driven by means of a belt 17 connected to any suitable source of power, said belt passing over pulley 17′ on the shaft. It will be understood that conveyors of various other types will be well suited for my purpose (e. g., an air-blast conveyor) and I contemplate substituting such conveyors for that shown in the drawing. The trough is supplied with ground feed by means of a pipe 18 opening into the right-hand end of the trough. As illustrated, any suitable material will be fed, by means such as a blower, through the pipe 18 into the conveyor trough but it will be understood that other conveyors can be used or that the material may be fed in manually by means of shovels or may be supplied in any other convenient or desirable manner to the trough.

The trough is supported by means of cross-beams 19 arranged at intervals along the length of the barn and here shown as supported by the rafters 20. At intervals along the length of the trough openings are provided at the bottom thereof and gates 21, 22, and 23 are here shown for closing the openings at appropriate times. In the present embodiment of the invention these openings are shown as three in number but it will be understood that the number may vary and the gates may swing or be operated in any other suitable way.

The means for supplying molasses or other liquid to the mixture comprises a source of supply such as a tank 24 here indicated as mounted above the roof of the barn and provided with a pipe 25 extending down through the same. This pipe has a horizontal part 26 (Fig. 1) provided adjacent each gate in the bottom of the trough with a branch opening downward. These branches when not in use are closed by valves 27. Each of the valves is adapted to be connected to an upwardly bent portion 28 of a coil 29 which is supported by means of a pair of hangers 30 having rollers 31 on a track 32 whereby the coil may be moved bodily from one end of the track to the other. The coil 29 is provided at intervals throughout its length with small holes 33 opening upwardly through the pipe so that the molasses will be forced out in an upward direction and will run around the pipe and flow off in drops instead of spurting out as it would if the holes were directed downward. The ground feed is prevented from clogging the holes by means of a guard comprising a strip 34 of sheet-metal or other suitable material coiled in similar manner to the pipe 29 and supported above the same by means of clips 35. In cases where the trough or the outer trough-like structure is closed on all sides and the feed is by means of an air blast, a wind muffler may be provided on the feed mixer for scattering the feed in a spiral whirl, but this is not needed with the screw conveyor.

In the operation of my device all the gates will be closed except one and the coil will be brought in a position underneath that one and attached to the corresponding branch pipe. The feeding apparatus for the ground feed will now be set in motion as will also the conveyor and the means for feeding the molasses or other fluid, the appropriate valve 27 being first opened. In some cases gravity may be relied on to feed the fluid. The solid material will sift through the coil and will collect in a pile as illustrated at 36 (Fig. 2) which pile will quickly assume a conical form, and the liquid falling on the pile contacts with the flakes or granules on the outer slope thereof and rolls down the side of the pile, thereby coating the drops of liquid with the ground feed and rendering the mixture more uniform, and such action may continue until the top of the pile reaches the coil 29, after which the coil may be moved to the next gate which is opened while the one previously used is closed. The appropriate valve is also opened and the one previously used is closed and the parts in general are manipulated appropriately for feeding through the second gate. The same operation may be repeated in succession for any number of gates, the number being varied, of course, according to the length of the storeroom. If it is desired that the storeroom be filled to a greater height than is possible by the method described, the piles of mixed feed may, of course, be spread out in any suitable manner. I have illustrated a runway at 37 for convenient use in detaching the coil from one of the branch pipes and moving it to another.

It will be obvious to those skilled in the art that arrangements could readily be made in a commercial plant for mixing materials in such proportions as would suit different feed buyers; and also that the device above described may be varied in many ways without departing from the spirit of the invention. Therefore I do not limit myself to what is shown in the drawings and described in the specification but only as indicated in the appended claims.

Having thus fully described my said invention, what I claim as new and desire to secure by Letters Patent is:

1. The combination of a storeroom, means for feeding fluent solid edible material in successive conical piles on the floor of the room, and means for projecting edible liquid material in drops on said conical piles independently, substantially as set forth.

2. The combination of a storeroom, a trough running across the room said trough having spaced openings therein, a conveyor in the trough, independent gates for said openings, means for supplying ground feed or the like to the trough and means for feeding liquid into intimate relation with ground feed proceeding from an opening in the trough, substantially as set forth.

3. The combination of a storeroom, a trough running across the room said trough having spaced openings therein, a conveyor in the trough, independent gates for said openings, and means for feeding liquid into intimate relation with incoherent solid material proceeding from an opening in the trough, substantially as set forth.

4. The combination of a storeroom, a trough running across the room said trough having spaced openings therein, a conveyor in the trough, independent gates for said openings, and a single means movable into operative relation with any one of said openings for feeding liquid into intimate relation with ground feed proceeding from an opening in the trough, substantially as set forth.

5. The combination of a storeroom, a trough running across the room said trough having spaced openings therein, a conveyor in the trough, independent gates for said openings, a track underneath the trough, a perforated coil movable on said track into position underneath any one of said openings, and means for supplying liquid to said coil, substantially as set forth.

6. The combination of a storeroom, a trough running across the room said trough having spaced openings therein, a conveyor in the trough, independent gates for said openings, a track underneath the trough, a perforated coil movable on said track into position underneath any one of said openings, a pipe parallel to said track, and means in operative relation to said openings for connecting the coil to said pipe, substantially a set forth.

7. The combination of a storeroom, a trough running across the room said trough having spaced openings therein, independently operated gates for said openings, a conveyor in said trough, a track underneath the trough, a perforated coil movable on said track into position beneath any one of said openings, a grain deflecting shield carried above said coil, a liquid feed pipe parallel to said track, and means in operative relation to said openings for connecting the coil to said pipe, substantially as set forth.

In witness whereof, I have hereunto set my hand and seal at Paoli, Oklahoma, this 15th day of July, A. D. nineteen hundred and twenty-five.

JAMES O. ALLSTOTT. [L. S.]